United States Patent
Sollars, Jr.

(10) Patent No.: US 6,688,642 B2
(45) Date of Patent: Feb. 10, 2004

(54) CONCENTRICALLY DISPOSED AIRBAG SYSTEM FOR SEATBELTS

(75) Inventor: John A. Sollars, Jr., LaGrange, GA (US)

(73) Assignee: Milliken & Company, Spartanburg, SC (US)

(*) Notice: Subject to any disclaimer, the term of this patent is extended or adjusted under 35 U.S.C. 154(b) by 0 days.

(21) Appl. No.: 09/930,613

(22) Filed: Aug. 15, 2001

(65) Prior Publication Data

US 2003/0034640 A1 Feb. 20, 2003

(51) Int. Cl.$^7$ ................................................ B60R 21/18
(52) U.S. Cl. ........................ 280/733; 280/743.1; 280/808
(58) Field of Search ............................. 280/733, 743.1, 280/801.1, 808

(56) References Cited

U.S. PATENT DOCUMENTS

| | | | | |
|---|---|---|---|---|
| 3,618,979 A | * | 11/1971 | Gulette | 280/731 |
| 3,682,498 A | * | 8/1972 | Rutzki | 280/733 |
| 3,836,168 A | | 9/1974 | Nonaka et al. | 280/150 AB |
| 3,841,654 A | | 10/1974 | Lewis | 280/150 AB |
| 3,848,887 A | | 11/1974 | Fox | 280/150 AB |
| 3,933,370 A | * | 1/1976 | Abe et al. | 280/733 |
| 4,348,037 A | | 9/1982 | Law et al. | 280/733 |
| 4,971,354 A | | 11/1990 | Kim | 280/733 |
| 5,062,662 A | | 11/1991 | Cameron | 280/733 |
| 5,125,682 A | * | 6/1992 | Hensler et al. | 280/730.1 |
| 5,162,006 A | * | 11/1992 | Yandle, II | 441/96 |
| 5,184,844 A | | 2/1993 | Goor | 280/733 |
| 5,393,091 A | | 2/1995 | Tanaka et al. | 280/733 |
| 5,642,902 A | * | 7/1997 | France | 280/737 |
| 5,794,971 A | * | 8/1998 | Boydston et al. | 280/733 |
| 5,863,065 A | * | 1/1999 | Boydston et al. | 280/733 |
| 5,871,230 A | * | 2/1999 | Lewis | 280/733 |
| RE36,661 E | * | 4/2000 | Tanaka et al. | 280/733 |
| 6,189,921 B1 | * | 2/2001 | Takeuchi | 280/733 |
| 6,237,945 B1 | * | 5/2001 | Aboud et al. | 280/733 |
| RE37,280 E | * | 7/2001 | Tanaka et al. | 280/733 |
| 6,352,282 B2 | * | 3/2002 | Hirose | 280/733 |
| 6,382,666 B1 | * | 5/2002 | Devonport | 280/733 |
| 6,428,042 B1 | * | 8/2002 | Fischer et al. | 280/739 |
| 6,505,851 B2 | * | 1/2003 | Frisch | 280/728.3 |
| 6,536,801 B2 | * | 3/2003 | Frisch | 280/743.1 |

OTHER PUBLICATIONS

International Search Report for US02/20213 filed Jun. 26, 2002 for Case No. 2672 "Concentrically Disposed Airbag System for Seats" (copy enclosed).

* cited by examiner

*Primary Examiner*—Paul N. Dickson
*Assistant Examiner*—Deanna Draper
(74) *Attorney, Agent, or Firm*—Terry T. Moyer; John E. Vick, Jr.

(57) ABSTRACT

An airbag system for seatbelts including a housing and an elongated one-piece tubular inflatable structure disposed within the housing, where the housing and inflatable structure include a seatbelt passageway so that a seatbelt may pass therethrough unhindered and unaffected during normal seatbelt use, while the inflatable structure remains in an uninflated state. In a collision event, an inflator causes the inflatable structure to unfold, or preferably unroll, and extend from the housing along the seatbelt, so that the inflatable structure surrounds the seatbelt over an extended length thereof to provide a cushion between the seatbelt and an occupant. Such an arrangement may be easily applied to existing seatbelt systems.

35 Claims, 9 Drawing Sheets

CONCENTRICALLY DISPOSED AIRBAG SYSTEM FOR SEATBELTS

BACKGROUND OF THE INVENTION

1. Field of the Invention

The present invention relates to an airbag system disposed about a seatbelt. More specifically, the present invention relates to an airbag system for seatbelts including a housing and an elongated tubular inflatable structure disposed within the housing, where the housing and inflatable structure include a seatbelt passageway so that a seatbelt may pass therethrough unhindered and unaffected during normal seatbelt use, while the inflatable structure remains in an uninflated state. In a collision event, an inflator causes the inflatable structure to unfold or unroll and extend from the housing along the seatbelt, so that the inflatable structure surrounds the seatbelt over an extended length thereof to provide a cushion between the seatbelt and an occupant.

2. Prior Art

Heretofore, seatbelt systems have been attached to the seats of vehicles such as automobiles and airplanes. A typical seatbelt system is arranged to restrain the occupant's body by a webbing upon the occurrence of an emergency situation such as a collision of the vehicle, thereby protecting the occupant from injury which would otherwise be done to him or her by collision with a part of the vehicle body. In such a seatbelt system, however, the width of the webbing, which constitutes a belt for restraining the occupant's body, is relatively small. Therefore, the occupant's body receives a heavy load in this small area in contact with the belt when restrained by the webbing.

A variety of inflatable seatbelt systems have been proposed in which the webbing is formed in the shape of a bag, and under normal circumstances, the bag shaped webbing is maintained in a strap like configuration so as to function as an ordinary seatbelt. When a collision event occurs, the bag shaped webbing is inflated by a gas introduced thereinto from a gas-generating device so as to function as an air belt. The inflatable element is generally disposed either sandwiched inside two outside layers of the load-bearing belt, or inside of a hollow load-bearing belt. The load bearing structure then splits or otherwise opens up to present the inflatable structure. One problem associated with this arrangement is that the inflatable belt tends to be bulky and heavy, which causes discomfort to an occupant, and the bag may become worn out through normal usage of the seatbelt system.

Another structure that has been previously developed provides the inflatable element adjustably attached to the outside of the load bearing belt in the vicinity of its final position along the length of the belt. This arrangement requires that the structure be positioned after the belt has been secured about or over the occupant. Further, the structure is bulky, and in its optimal position, sits directly on the stomach, chest or lap of the occupant.

Thus, it would be advantageous to provide an inflatable airbag system for seatbelts, where the bag is not stored within the seatbelt or on top of an occupant, in order to prevent wearing of the bag through normal use of the seatbelt system and to improve comfort. It would further be advantageous to provide such a system that would not affect or interfere with the normal use of the seatbelt, and that could be employed in existing airplanes and back seats of land vehicles, where other types of airbag systems are not currently feasible.

Objects of the Invention

Accordingly, an object of the present invention is to provide an inflatable airbag system for seatbelts that is concentrically disposed about a seatbelt, having a passageway formed in a middle portion thereof so that a seatbelt may freely pass therethrough while the bag is in the deflated state.

It is another object of one embodiment of the present invention to provide an inflatable airbag system for seatbelts that may be used in combination with pre-existing seatbelts in a variety of vehicles, including automobiles and airplanes.

Still another object of the present invention is to provide an inflatable airbag system for seatbelts, so that in a collision event, the inflatable portion extends from a module or housing and concentrically rolls along the seatbelt, so that it is disposed about an extended portion of the seatbelt in a slidable manner during an inflated state.

Yet another object of the present invention is to provide an inflatable airbag system for seatbelts where the module housing the inflatable portion is in a convenient, out-of-the-way position with respect to the seatbelt and the occupant, so that it causes no discomfort during normal use, and so that it is not subjected to general wear and tear from normal use.

Still another object of the present invention is to provide an inflatable airbag system for seatbelts having a one-piece inflatable structure with an open end that is attached and sealed to a housing member.

Another object of the present invention is to provide an inflatable airbag system for seatbelts that is inexpensive to manufacture, and which overcomes some of the problems associated with other types of inflatable seatbelt systems.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
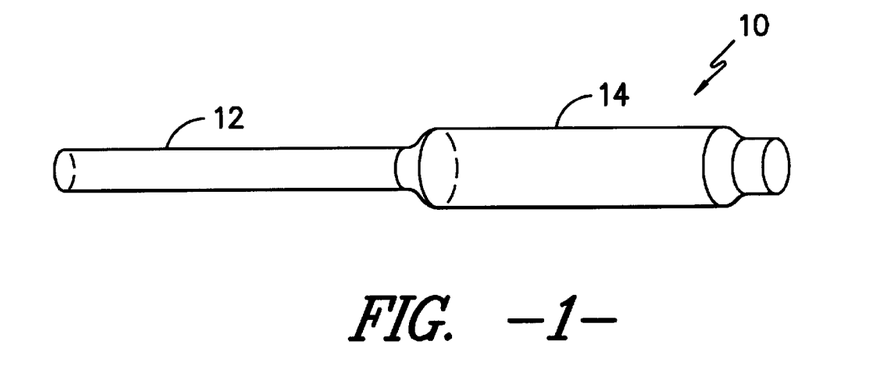
FIG. 1 is a side view of the tubular structure used to form the concentrically disposed inflatable structure, where the tubular structure comprises a narrow portion and a wide portion.
Figure 2:
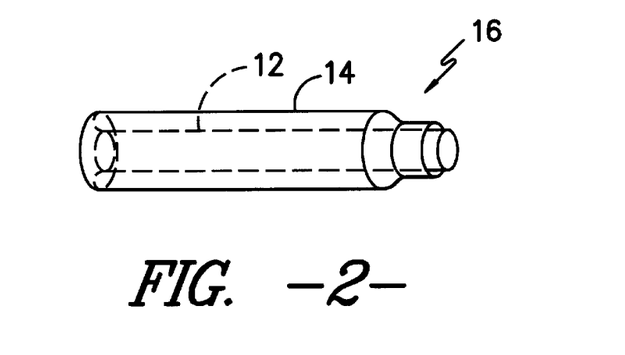
FIG. 2 is a side view of the tubular structure, where the narrow portion has been folded back through the wide portion to form the inflatable structure.
Figure 3:
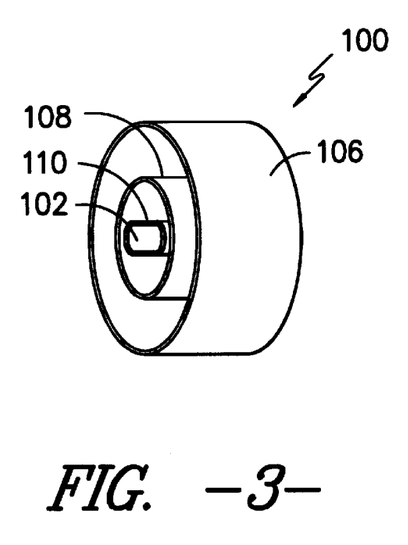
FIG. 3 is a perspective view of a housing for the inflatable structure.

FIG. 1 shows a basic one-piece tubular structure 10 having a narrow portion 12 and a wide portion 14, and which includes an opening at each end. The narrow portion 12 of the structure is then pulled back through the center of the wide portion 14, so that the narrow portion 12 is in proximity to and concentric with the wide portion 14 to form the inflatable structure 16, as shown in FIG. 2. The configuration shown in FIG. 2 is the basic shape of the inflatable structure during an inflated and deployed state. The narrow inner portion 12 provides a seatbelt passageway through which a seatbelt may freely pass.

Figure 4:
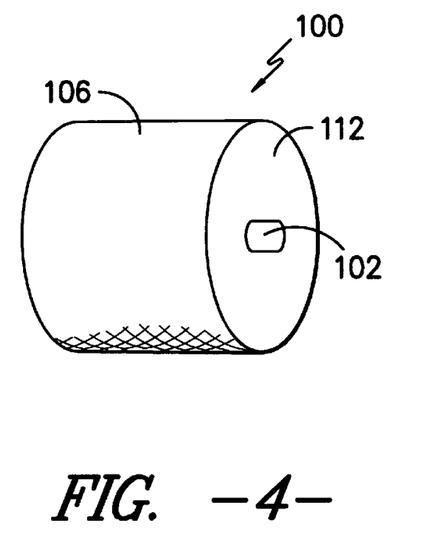
FIG. 4 is a perspective view of a backside of the housing shown in FIG. 3.
Figure 5:
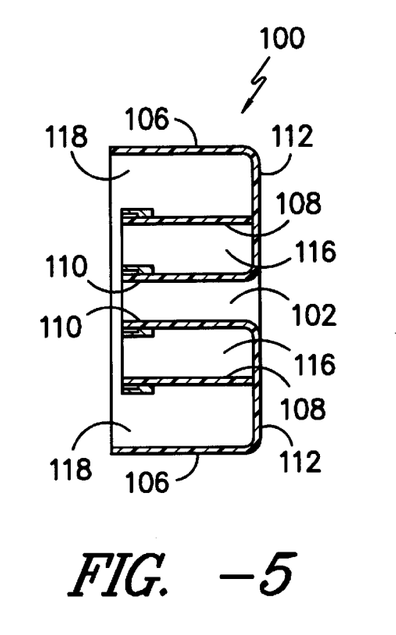
FIG. 5 is a cross sectional view of the housing for the inflatable structure.
Figure 6:
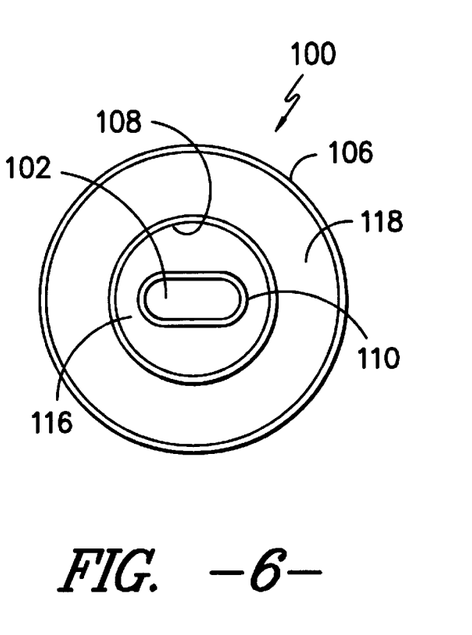
FIG. 6 is a frontal view of the housing for the inflatable structure.

FIGS. 3 through 6 show a concentric housing member 100, having a seatbelt passageway 102 to allow a seatbelt 104 to pass slidably therethrough. The housing 100 includes an outer wall 106, an intermediate wall 108, and an inner passageway wall 110. An end cap 112 is disposed on a bottom end of the housing member 100, as shown in FIG. 4, and includes an opening for the passageway 102. An airbag cover (not shown) is positioned on a top portion of the housing 100. The cover is designed to open or tear away from the housing 100 in the event of a collision, to allow the inflatable structure 16 to extend from the housing 100 outwardly along the seatbelt 104.

Figure 7:
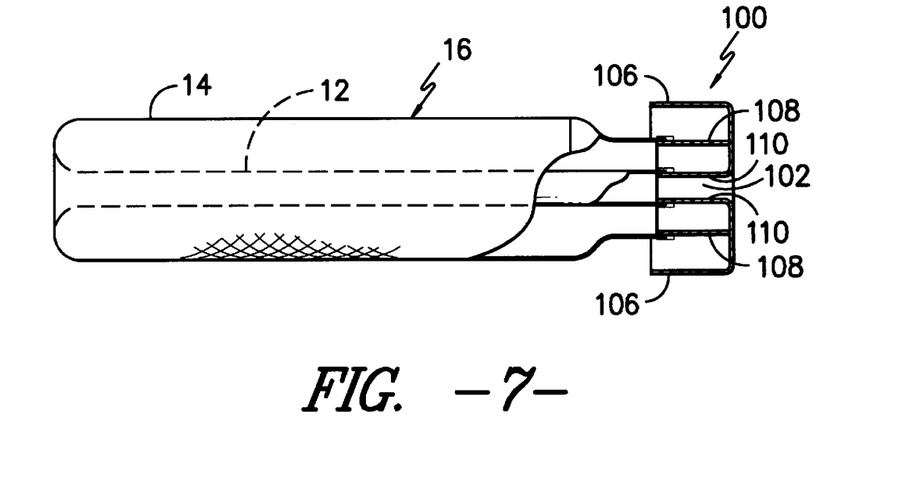
FIG. 7 is a cross sectional side view of the inflatable structure in an inflated state and the housing attached thereto.
Figure 8A:
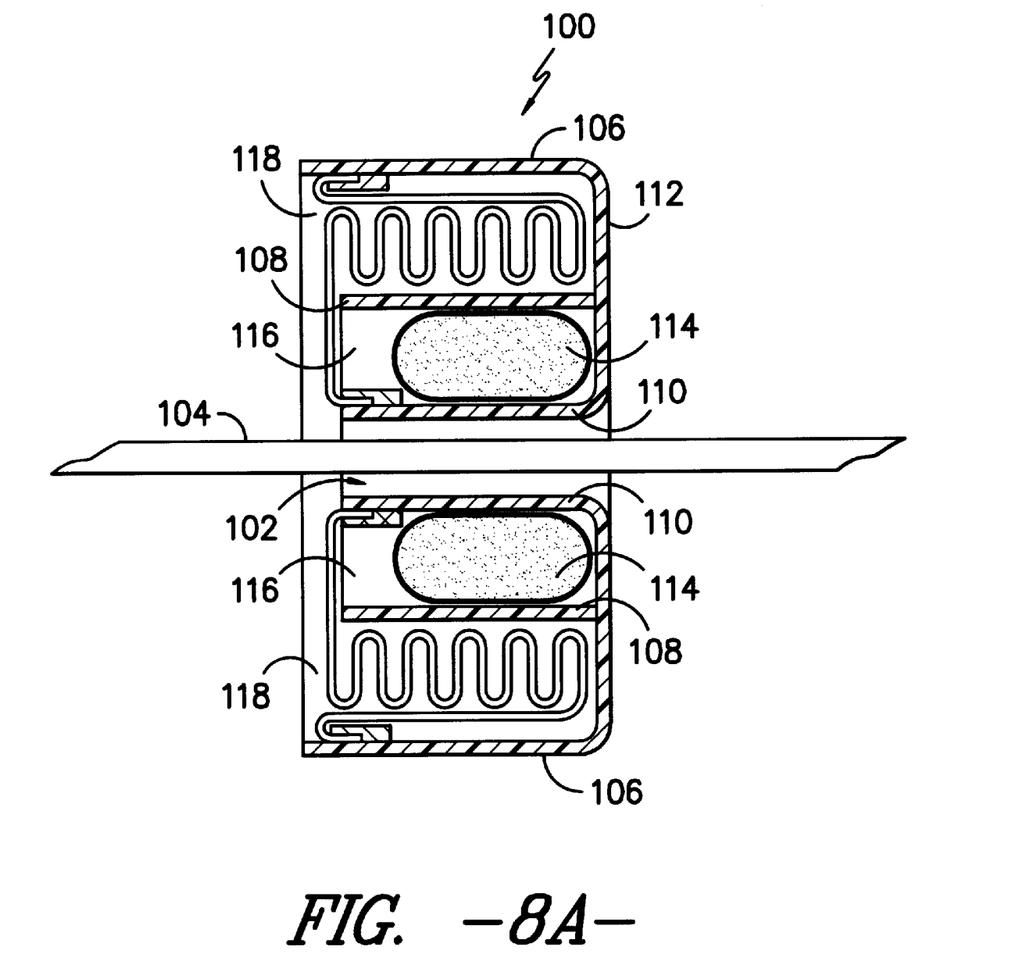
FIG. 8A is a cross sectional view of the housing and the inflatable structure in an uninflated state, wherein the housing is concentrically disposed about a seat belt and wherein the outer portion of the inflatable structure is connected to an outer concentric wall on the housing, and the inner portion of the inflatable structure is connected to the inner passageway wall of the housing.
Figure 8B:
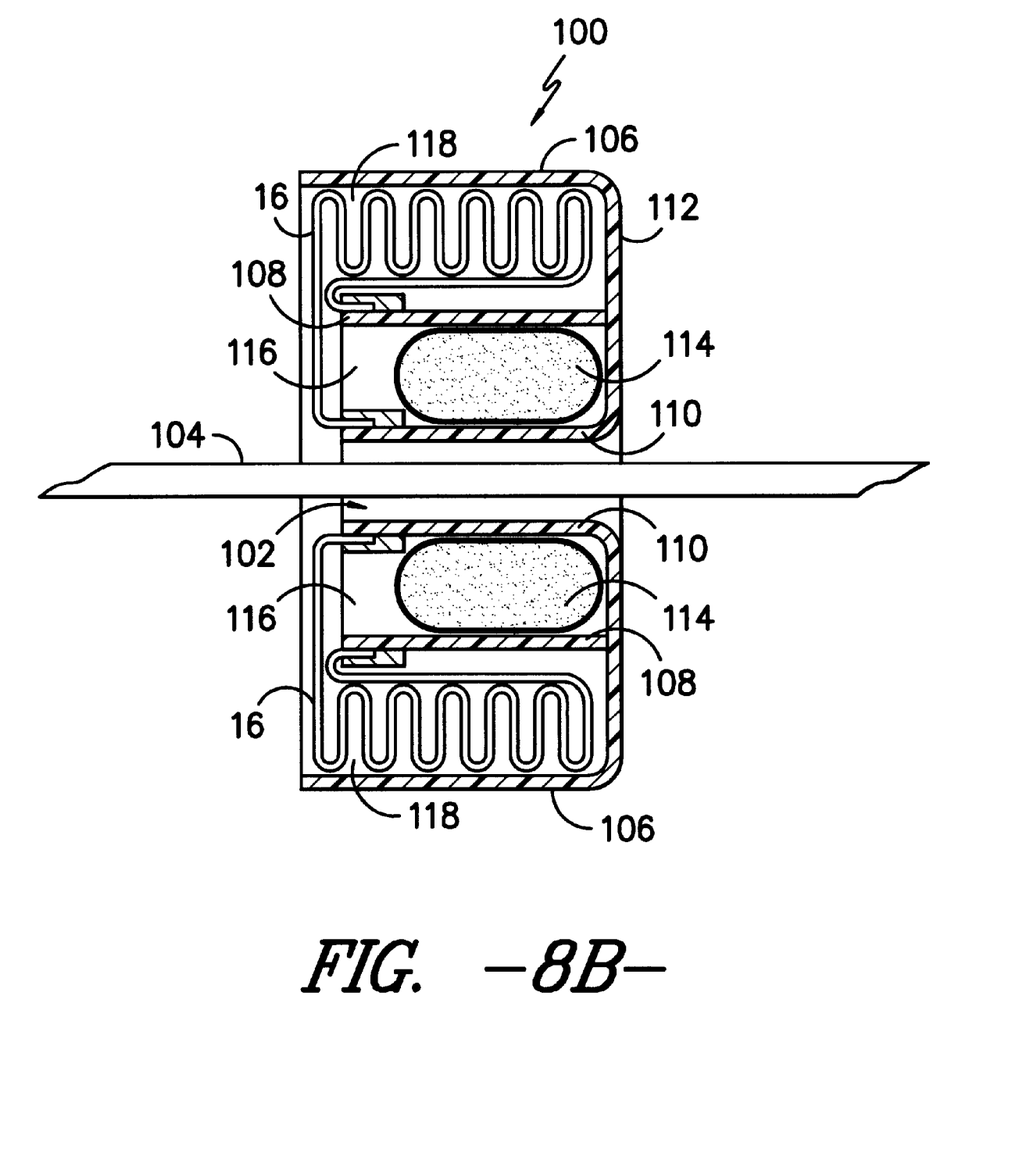
FIG. 8B is a cross sectional view of an alternate embodiment to that shown in FIG. 8A, wherein the outer portion of the inflatable structure is connected to an intermediate concentric wall on the housing, and the inner portion of the inflatable structure is connected to the inner passageway wall of the housing.
Figure 8C:
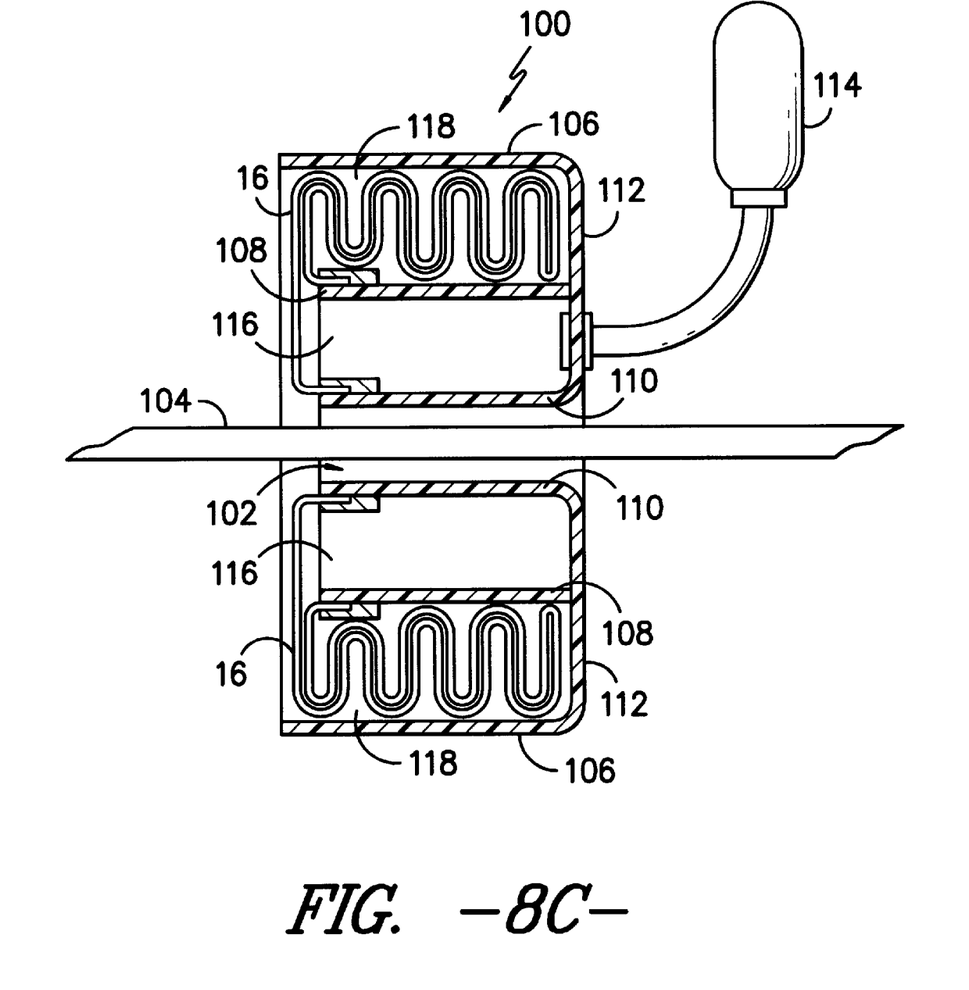
FIG. 8C is a cross sectional view of an alternate embodiment to that shown in FIG. 8A, further including an external inflator connected to the housing by means of a gas supply tube.

FIG. 7 shows the one-piece inflatable structure 16 connected to the housing. It is contemplated that the inflatable structure may be made from multiple pieces of fabric, and may be connected to the housing by any suitable means, including crimping, bonding, gluing, or by means of a concentric ring. It may be seen that the wide outer portion 14 of the inflatable structure 16 is attached to the intermediate wall 108 of the housing 100, and the inner narrow portion 12 of the inflatable structure 16 is attached to the inner passageway wall 110, as shown in FIGS. 7 and 8B. It is also contemplated that the wide outer portion 14 of the inflatable structure 16 may be attached to the outer wall 106, as shown in FIG. 8A. This arrangement allows a seatbelt 104 to pass slidably through the entire structure in either an inflated or non-inflated state. The fluid or gas source 114 used to inflate the airbag is supplied into the gas chamber 116 between the inner passageway wall 110 and the intermediate wall 108. The gas may be provided to this gas chamber 116 from an external source as shown in FIG. 8C, or the inflator may be self-contained within the housing 100, or more specifically, within the gas chamber 116.

In a non-inflated state, the inflatable structure 16 is stored within the housing 100, as shown in FIGS. 8A and 8B. The inflatable structure 16 may either be folded or rolled inside out, and is then positioned within the storage chamber 118 between the outer wall 106 and the intermediate wall 108 of the housing 100. Again, it should be noted that the housing 100 is not directly attached to the seatbelt 104, and the seatbelt 104 may function normally and is substantially unaffected by the presence of the housing 100 and inflatable structure 16.

Figure 9A:
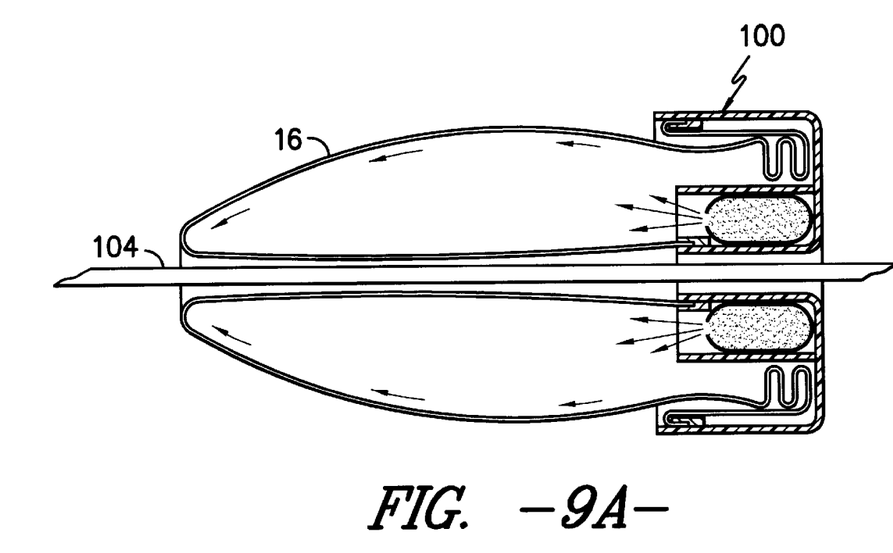
FIG. 9A is a side view of the inflatable structure shown in FIG. 8A extending from the housing and rolling along the seatbelt to cover an extended portion thereof.
Figure 9B:
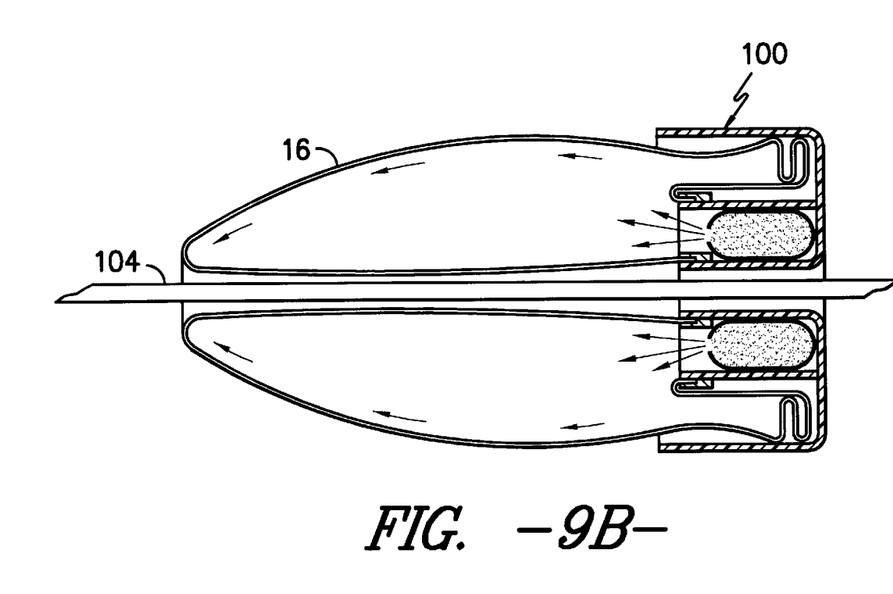
FIG. 9B is a side view of the inflatable structure shown in FIG. 8B extending from the housing and rolling along the seatbelt to cover an extended portion thereof.

During a collision event, a sensor (not shown) senses the collision and actuates an inflator 114, which provides gas to the gas chamber 116. The inflatable structure 16 then extends through the airbag cover and unrolls (or unfolds) along the length of the seatbelt 104, thereby totally surrounding an extended length of the seat belt 104, as shown in FIGS. 9A and 9B. It is preferred that the inflatable structure 16 unroll concentrically along the seatbelt 104, rather than unfolding, because frictional forces produced by a sliding action may encumber the inflation motion. In the inflated state, the seat belt 104 passes in slidable relation through the center axis of the entire structure: through the seatbelt passageway 102 of the housing 100, and through the seatbelt passageway formed by the narrow inner portion 12 of the inflatable structure 16.

Figure 15A:
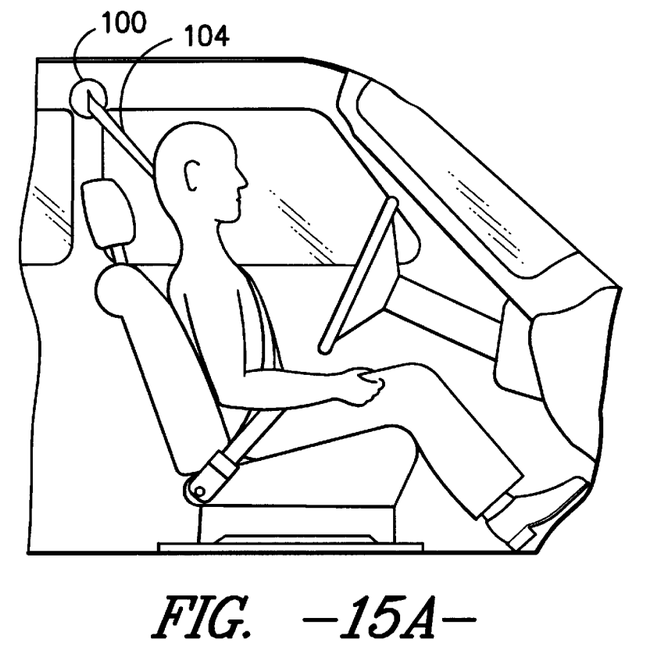
FIG. 15A shows a side view of the concentric seatbelt airbag system where the housing member is attached to an automobile from an upper position adjacent an occupant's shoulder, so that in a collision event, the bag will deploy in a downward direction along the shoulder harness.
Figure 15B:
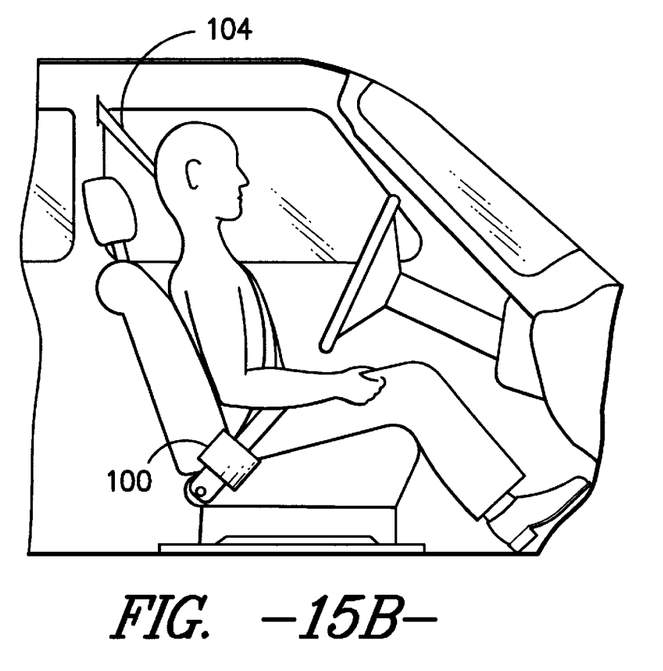
FIG. 15B shows a side view of the concentric seatbelt airbag system where the housing member is attached to the seat structure adjacent a base portion of the seat, so that in a collision event, the bag will deploy in an upward direction along the lap belt.

The inflatable structure 16 may deploy from any number of positions. First, the housing 100 may be positioned in a vehicle above the occupant about a shoulder strap as shown in FIG. 15A, which causes the inflatable structure 16 to deploy downwardly at an angle along the shoulder harness 104 to protect the upper torso and head region from frontal or side impact. Further, the inflatable structure 16 may be configured to deploy only partially down the length of the seatbelt 104 for head and shoulder protection during side impact collisions. Alternatively, the housing 100 may be positioned adjacent the floor or seat structure so that the inflatable structure 16 deploys along the lap seat belt 104 to protect the abdomen and chest area. It is to be understood that the entire unit may be disposed in any desired and suitable position along a seatbelt 104.

Figure 10:
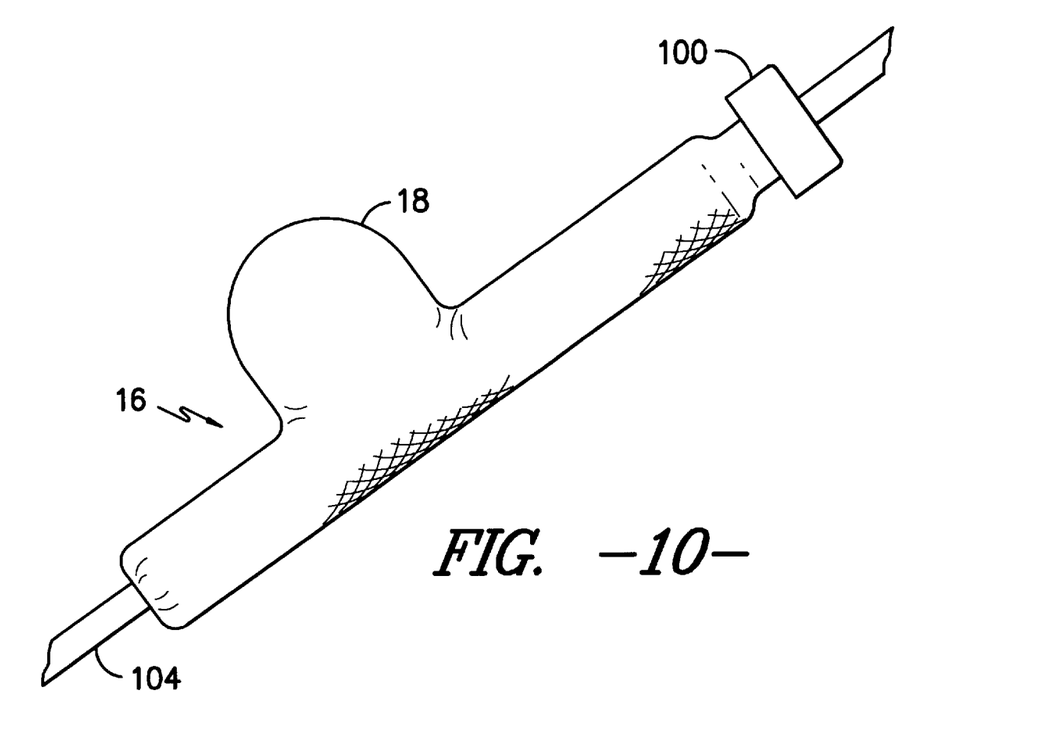
FIG. 10 is a front view of an alternate embodiment of an inflatable structure, wherein the inflatable structure includes a bulge for additional protection for an occupant.
Figure 11:
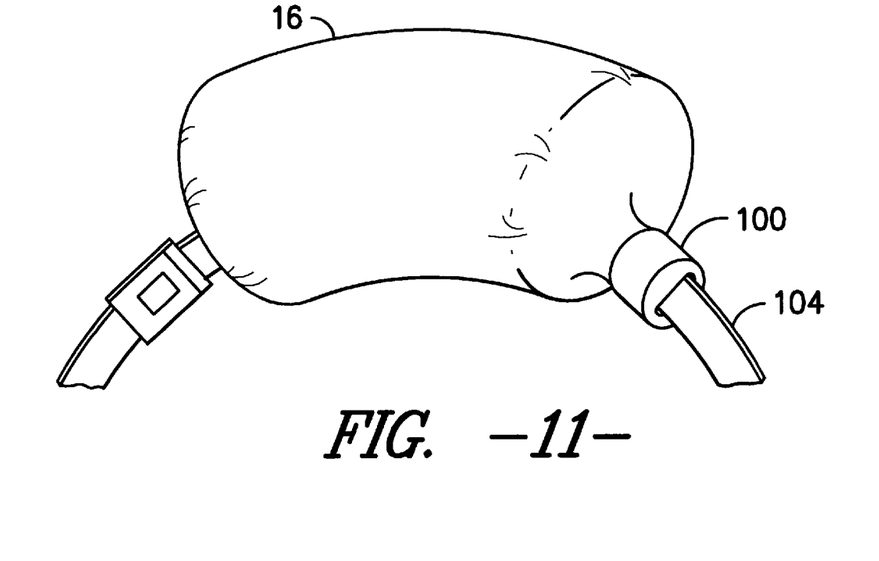
FIG. 11 is a front view of another alternate embodiment of the inflatable structure suitable for use on an airplane.

It should be understood that the shape of the inflatable structure 16 is not limited to a symmetric tubular structure. As shown in FIG. 10, the inflatable structure 16 may include a protruding section 18, designed and positioned to protect the head of an occupant from a side impact. The inflatable structure 16 may also be of an irregular cross section with a relatively large diameter as shown in FIG. 11. This structure is stored in the seat structure to deploy along the lap seat belt to protect occupants, particularly in an airplane.

Figure 12:
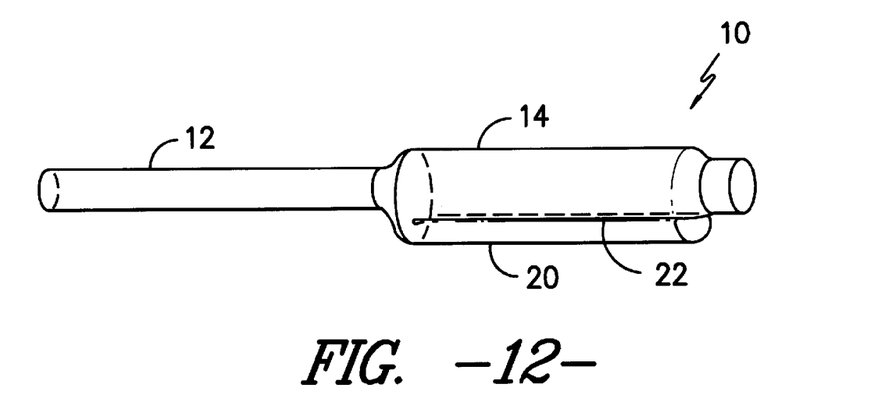
FIG. 12 is a cross sectional side view of another embodiment of the tubular structure having a narrow portion and a wide portion, wherein a secondary inflatable chamber is present within the wide portion.
Figure 13:
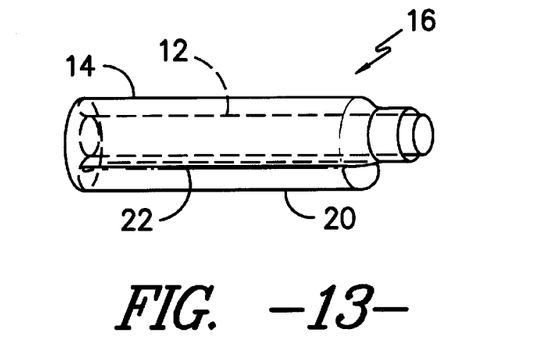
FIG. 13 is a cross sectional side view of the embodiment shown in FIG. 12, where the narrow portion has been folded back through the wide portion to form the inflatable structure.
Figure 14:
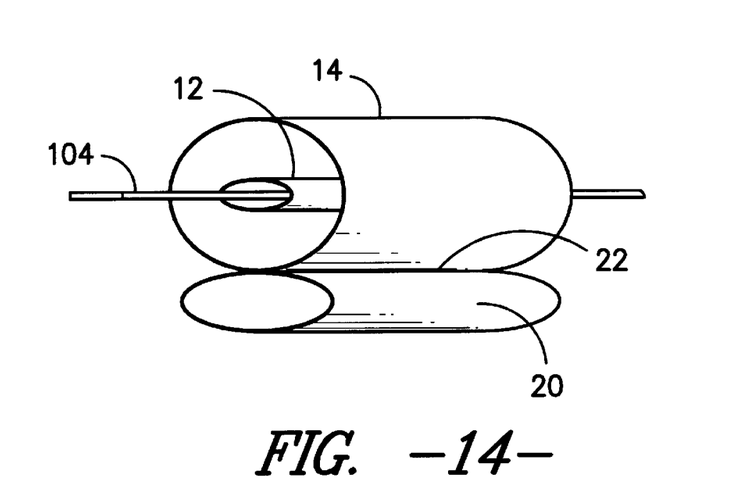
FIG. 14 is a cross sectional transverse view of the embodiment shown in FIGS. 12 and 13, showing the seatbelt disposed within the passageway through the inflatable structure, and further showing the secondary inflatable chamber therebelow.

FIGS. 12 through 14 show an alternate embodiment of the inflatable structure 16, which further includes a secondary inflation chamber 20. The secondary chamber may be formed by an additional piece of fabric 22 attached to an inner section of the wide portion 14 of the inflatable structure 16, as shown. In some circumstances, there is a need for the inflatable structure 16 to have a secondary chamber 20 that inflates during a different time sequence than the initially inflating portion. In the case of an automotive shoulder harness, it would be desirable to provide a structure that would facilitate movement between the belt and an occupant by minimizing the bulk therebetween, and then to inflate a secondary chamber 20 positioned between the occupant and the belt 104 after the inflatable structure 16 is in the extended position. The arrangement shown in FIGS. 12 through 14 allows the inflatable structure 16 to fully extend, and then to inflate the secondary chamber 20 between the occupant and the seat belt 104 to provide additional cushion and protection to the torso of the occupant.

Although the present invention has been described in considerable detail with reference to certain preferred versions thereof, other versions are possible. Therefore, the spirit and scope of the appended claims should not be limited to the description of the preferred versions contained herein.

What is claimed is:

1. An airbag system for use on vehicle seatbelts comprising:
    a tubular inflatable structure having an inflated configuration and an uninflated configuration, wherein in said inflated configuration said tubular inflatable structure comprises a longitudinal central axis, an open end and a closed end, said tubular inflatable structure further having a first seatbelt passageway positioned along said longitudinal central axis;
    wherein said open end of said inflatable structure is attached to a housing member, thereby forming a closed system, and wherein said inflatable structure is positioned in the uninflated configuration within said housing member;
    said housing member having a second seatbelt passageway in communication with said first seatbelt passageway, said first and second seatbelt passageways being aligned with reference to said longitudinal central axis so that a seatbelt may freely pass through said second seatbelt passageway when said tubular structure is in said uninflated configuration; and
    wherein upon a collision event, said tubular structure becomes inflated and extends from said housing member along the length of said seat belt, to an inflated configuration parallel to said longitudinal central axis,,, thereby providing an inflated cushion between said seatbelt and a user, so that said tubular structure is positioned in the inflated configuration about an extended length of said seatbelt.

2. The airbag system set forth in claim 1, wherein said system is positioned about a shoulder harness seatbelt.

3. The airbag system set forth in claim 1, wherein said system is positioned about a lap seatbelt.

4. The airbag system set forth in claim 1, wherein said housing member includes an inflator.

5. The airbag system set forth in claim 1, wherein said inflatable structure is rolled up and stored within said housing member in an uninflated configuration.

6. The airbag system set forth in claim 1, wherein said inflatable structure is folded up and stored within said housing member in an uninflated configuration.

7. The airbag system set forth in claim 1, wherein said inflatable structure also includes a secondary inflation chamber.

8. The airbag system set forth in claim 7, wherein said secondary inflation chamber is sequentially the last portion of said inflatable structure to become inflated.

9. The airbag system set forth in claim 1, wherein said inflatable structure includes a protruding section.

10. The airbag system set forth in claim 1, wherein said housing member includes a storage chamber and a gas chamber, said chambers being separated by a wall.

11. An apparatus comprising:
    an inflatable structure for use with a seatbelt, said inflatable structure having an open end and a closed end;
    a housing connected to said open end of said inflatable structure forming a closed system, said housing having a storage chamber and a gas chamber separated by a wall, said inflatable structure being compactly disposed within said storage chamber and positioned about a seatbelt when said structure is in an uninflated state, so that said seatbelt may function in a normal manner without interference from said inflatable structure in said uninflated state;
    wherein said inflatable structure is configured for receiving gas from said gas chamber, said inflatable structure being configured for movement from said storage chamber and along the length of said seatbelt upon inflation, said inflatable structure extending along said seatbelt in an inflated state, surrounding an extended longitudinal length of said seatbelt in slidable relation therewith.

12. The apparatus set forth in claim 11, wherein said inflatable structure includes a protruding section.

13. The apparatus set forth in claim 11, wherein said gas chamber and said storage chamber are concentrically disposed with relation to each other.

14. The apparatus set forth in claim 11, wherein said inflatable structure includes a secondary inflation chamber.

15. The apparatus set forth in claim 11, wherein said inflatable structure is rolled up and stored within said housing member.

16. The apparatus set forth in claim 11, wherein said inflatable structure is folded up and stored within said housing member.

17. In an airbag system for seatbelts, an inflatable structure is provided, said inflatable structure having an inflated position and an uninflated position, wherein said inflatable structure is mounted within a housing in said uninflated position, said housing being operably connected to a seatbelt, said housing having a storage chamber and a gas chamber, said inflatable structure being disposed within said storage chamber in the uninflated position, and wherein said inflatable structure and said housing are positioned around the periphery of a seatbelt in concentric, slidable relation therewith, further wherein said inflatable structure includes an open end configured for attachment to said housing, and a closed end capable of slidable relation along the length of said seatbelt.

18. The structure set forth in claim 17, wherein said open end of said inflatable structure is attached to said intermediate wall of said housing, thereby forming a closed system.

19. The structure set forth in claim 17, wherein said inflatable structure is housed in said housing in a rolled configuration during an uninflated state, so that in a collision event, said inflatable structure inflates and extends from said housing by rolling along a length of a seatbelt.

20. The structure set forth in claim 17, wherein said gas chamber is configured for providing high pressure gas to inflate said inflatable structure.

21. The structure set forth in claim 17, wherein said housing further includes an inflator within said housing.

22. An airbag system for passenger restraint for use in combination with en vehicle seatbelts comprising:

(a) a seatbelt for restraining a passenger, said seatbelt being held in position across the upper body of a passenger and in close association therewith, said seatbelt being held in a longitudinal axis, said axis being positioned generally perpendicular to the direction of travel of said vehicle; and (b) an integrally formed tubular inflatable structure along said longitudinal axis, said integrally formed tubular inflatable structure having an inner sleeve portion disposed concentrically within an outer sleeve portion; and said tubular inflatable structure having a first seatbelt passageway extending through said inflatable structure and along said axis, said seatbelt being positioned within said seatbelt passageway;

wherein said longitudinal tubular inflatable structure is disposed for inflation by receiving a gas within said tubular inflatable structure, thereby expanding said inflatable structure so as to extend said inflatable structure along said longitudinal axis.

23. An airbag system for use on vehicle seatbelts comprising:

an integrally formed tubular inflatable structure having a longitudinal axis, said integrally formed tubular inflatable structure having an inner sleeve portion disposed concentrically within an outer sleeve portion; and said tubular inflatable structure having a first seatbelt passageway extending through said inflatable structure and along said axis, wherein said longitudinal tubular inflatable structure is disposed for inflation by receiving a gas within said tubular inflatable structure, thereby expanding said inflatable structure so as to extend said inflatable structure along said axis, wherein said tubular inflatable structure includes an open end, said open end being attached to a housing member forming a closed system, and wherein said inflatable structure is positioned within said housing member in an uninflated state.

24. The structure set forth in claim 23, wherein said housing member includes a second seatbelt passageway in communication with said first seatbelt passageway provided by said tubular inflatable structure, so that a seatbelt may freely pass through each said second seatbelt passageway when said structure is in the uninflated state.

25. An airbag for use on vehicle seatbelts comprising:

a longitudinal tubular inflatable structure having an open end and a closed end, and having a seatbelt passageway through a longitudinal axis thereof;

wherein said inflatable structure is formed by providing a tubular structure having a first open end and a second closed end, and partially inverting said first open end by pulling it inwardly toward the second closed end, until said first open end is concentrically disposed within said second closed end, said airbag further including a secondary inflation chamber.

26. An airbag for use on vehicle seatbelts comprising:

a longitudinal tubular inflatable structure having an open end and a closed end, and having a seatbelt passageway through a longitudinal axis thereof;

wherein said inflatable structure is formed by providing a tubular structure having a first open end and a second closed end, and partially inverting said first open end by pulling it inwardly toward the second closed end, until said first open end is concentrically disposed within said second closed end, wherein said tubular structure comprises a narrow portion having a first diameter on said first end and a wide portion having a larger diameter than said first diameter on said second end;

wherein said wide portion of said tubular structure includes a protruding section.

27. Inflatable airbag structure comprising:

(a) an inflatable structure being capable of expanding to form a first inflated configuration, said first inflated configuration providing a central longitudinal axis, said inflated configuration having an an open passageway through said central longitudinal axis, and (b) a housing member having concentrically arranged chambers around an open passageway through a central portion thereof, said housing member having an innermost gas chamber, said housing member further having a storage chamber positioned concentrically outside the periphery of said gas chamber; and (c) said inflatable structure being attached to said housing member, said inflatable structure being stored within said storage chamber.

28. The inflatable airbag structure set forth in claim 27, wherein said housing member includes a conduit for inflation gas supplied from an external source.

29. The inflatable airbag structure set forth in claim 27, wherein said housing includes an inflator for supplying inflation gas to said airbag structure.

30. The inflatable airbag structure set forth in claim 27, wherein said longitudinal inflatable structure is stored in one of said concentrically arranged chambers within said housing member.

31. The inflatable airbag structure set forth in claim 30, wherein said longitudinal inflatable structure is configured to deploy by unrolling down the length of a seatbelt.

32. The inflatable airbag structure set forth in claim 30, wherein said longitudinal inflatable structure is configured to deploy by unfolding down the length of a seatbelt.

33. The inflatable airbag structure set forth in claim 27, wherein inflatable airbag structure is mounted so that a shoulder harness passes through said passageway in said housing member and said longitudinal inflatable structure, and wherein said inflatable structure is configured to deploy partially down a length of said seatbelt for head and shoulder protection of an occupant during a collision event.

34. The inflatable airbag structure set forth in claim 27, wherein said longitudinal inflatable structure includes a secondary chamber designed to inflate sequentially after the rest of said inflatable structure.

35. The inflatable airbag structure set forth in claim 27, wherein said longitudinal inflatable structure is attached to said housing member by means selected from the group consisting of: crimping, bonding, a concentric ring, and any combination thereof.

* * * * *

UNITED STATES PATENT AND TRADEMARK OFFICE
CERTIFICATE OF CORRECTION

PATENT NO. : 6,688,642 B2 Page 1 of 1
DATED : February 10, 2004
INVENTOR(S) : Sollars, Jr.

It is certified that error appears in the above-identified patent and that said Letters Patent is hereby corrected as shown below:

Column 7,
Line 12, after the word "with" delete the word "en".

Signed and Sealed this

Fifth Day of October, 2004

JON W. DUDAS
*Director of the United States Patent and Trademark Office*